United States Patent
Greffioz et al.

(10) Patent No.: US 8,561,284 B2
(45) Date of Patent: Oct. 22, 2013

(54) MACHINING MEANS FOR CEILING FIXED PARTS

(75) Inventors: Andre Greffioz, Capdenac (FR); Michel Vives, Aucamville (FR)

(73) Assignee: Airbus Operations SAS (FR)

( * ) Notice: Subject to any disclaimer, the term of this patent is extended or adjusted under 35 U.S.C. 154(b) by 1001 days.

(21) Appl. No.: 12/441,168

(22) PCT Filed: Sep. 21, 2007

(86) PCT No.: PCT/FR2007/001549
§ 371 (c)(1),
(2), (4) Date: Oct. 15, 2009

(87) PCT Pub. No.: WO2008/037883
PCT Pub. Date: Apr. 3, 2008

(65) Prior Publication Data
US 2012/0328385 A1 Dec. 27, 2012

(30) Foreign Application Priority Data

Sep. 21, 2006 (FR) ..................... 06 53873
Sep. 21, 2006 (FR) ..................... 06 53875

(51) Int. Cl.
| | | |
|---|---|---|
| B23Q 41/00 | (2006.01) | |
| B23Q 11/08 | (2006.01) | |
| B23Q 1/44 | (2006.01) | |
| B23Q 1/01 | (2006.01) | |
| B23C 1/06 | (2006.01) | |
| B23C 1/08 | (2006.01) | |

(52) U.S. Cl.
USPC ............. 29/563; 409/201; 409/235; 409/137; 409/134; 409/221; 408/16

(58) Field of Classification Search
USPC ......... 409/201, 211, 216, 235, 137, 134, 221; 408/234, 16; 74/490.01, 490.03, 74/490.05, 490.07, 490.1; 29/563
See application file for complete search history.

(56) References Cited

U.S. PATENT DOCUMENTS 4,962,676 A * 10/1990 Vainstock ..................... 74/490.1
6,328,510 B1 * 12/2001 Hanrath et al. ............... 409/235
(Continued)

FOREIGN PATENT DOCUMENTS

AT         411 445 B     1/2004
DE     41 17 723 A1   12/1991
(Continued)

OTHER PUBLICATIONS

Machine translation of AT 411445, which AT '445 was published Jun. 15, 2003.*
"International Search Report," PCT/FR2007/001549, mailed Mar. 19, 2008.

*Primary Examiner* — Erica E Cadugan
(74) *Attorney, Agent, or Firm* — Lerner, David, Littenberg, Krumholz & Mentlik, LLP (57) ABSTRACT

A machining device has a machine head capable of displacement along at least three translation axes X, Y, Z for machining an immobile part fixed above the machining head. The machining head is maintained in a constant orientation by at least three articulated connecting rods. Two connecting rods define together with the machining head and with a first Y carriage, on which they are articulated, an deformable articulated parallelogram in the XZ plane. Another connecting rod is articulated on the machining head and on a second Y carriage and the second Y carriage is capable of displacement along Y on a second X carriage capable of displacement along X. The relative movement along X of the Y carriages results in a displacement in the Z direction. Several devices can be positioned in a plurality of tunnels, these tunnels being arranged so as to share several things.

35 Claims, 6 Drawing Sheets

(56) References Cited

U.S. PATENT DOCUMENTS

| | | |
|---|---|---|
| 6,387,026 B1 * | 5/2002 | Schweizer et al. ............ 409/201 |
| 6,557,235 B1 * | 5/2003 | Katz et al. .................... 409/235 |
| 6,655,247 B1 * | 12/2003 | Walker et al. .................. 82/122 |
| 6,719,506 B2 * | 4/2004 | Chang et al. .................. 409/201 |
| 2004/0052628 A1 * | 3/2004 | Thurneysen et al. ......... 414/699 |

FOREIGN PATENT DOCUMENTS

| | | |
|---|---|---|
| DE | 196 50 360 A1 | 5/1998 |
| DE | 198 39 503 A1 | 4/2000 |
| EP | 1 243 376 A | 9/2002 |
| JP | 03-149155 A * | 6/1991 |
| WO | 97/22436 A | 6/1997 |

\* cited by examiner

| Y-carriage driven along the Y-axis by a ball screw located in the top of the beam | Y-carriage driven along the Y-axis by a ball screw located in the top of the beam |

Fig. 9

Numerical control means for controlling the movements of the X and Y carriages

Fig. 10

At least one video surveillance camera inside the tunnel

Fig. 11

Arrangement wherein side-by-side tunnels share a common side wall

Fig. 12

Arrangement wherein two side-by-side tunnels each include two machining devices

MACHINING MEANS FOR CEILING FIXED PARTS

CROSS-REFERENCE TO RELATED APPLICATIONS

This application is the National Stage of International Application No. PCT/FR2007/001549, International Filing Date 21 Sep. 2007, which designated the United States of America and which International Application was published under PCT Article 21 (2) as WO Publication No. WO2008/037883 A2 and which claims priority to French Application No. 06 53875, filed 21 Sep. 2006, and French Application No. 06 53873, filed 21 Sep. 2006, the disclosures of which are incorporated herein by reference in their entireties.

BACKGROUND

1. Field

The disclosed embodiments relate to numerical-control machine tools for machining parts or workpieces with at least one large dimension. More specifically they relate to a machining device in which the workpiece is positioned in a fixed manner on a fixed table above the machining means, and in which the machining tools move during the machining operations.

2. Brief Description of Related Developments

When workpieces are of large dimensions, and therefore difficult to fix and hold in a precise position, the solution employed is to hold the workpiece immobile on a table, which is also immovable, rigid, and very firmly fixed, and to move the tools that are to machine the workpiece by means of a gantry above the table.

The gantry generally comprises a horizontal crossmember supported by two side posts.

The gantry travels along one of the axes of the table, specifically the longest axis, and bears on high precision sliding tracks fixed to the table. It carries one or more machining heads that travel along the horizontal crossmember of the gantry.

The machining head or heads are also capable of executing various movements necessary for machining movements of translation to bring the machining tool towards the table, and in certain cases movements of rotation to tilt the axis of rotation of the machining tool.

Machines of this type are very common in the industry and enable very long tables, sometimes exceeding several tens of meters, to be used.

However, machines of this type have several drawbacks which complicate their use and reduce their industrial profitability.

On the one hand, gantries, owing to the complexity of the machining heads which they support and the necessary precision of the machining operations, have to be as rigid as possible. To achieve this rigidity, gantries have to be very voluminous and very heavy, with weights of 20 or 30 tons or more, which complicates their movements and in practice limits the speeds of travel, particularly when not engaged in machining.

On the other hand, gantries operate by machining workpieces placed on the top of the table, from above, causing a buildup of chips of material removed by the machining action and necessitates the provision of means of removal which may make it necessary to interrupt the machining operations.

SUMMARY

The aspects of the disclosed embodiments provide an assembly comprising a machining head and means of moving said head whose mass is very low compared with systems using a gantry, and having greater stiffness suitable for the machining of overhead workpieces, that is, on the underside of a table on which the workpiece is held during machining.

To achieve this result a machining device comprises a machining head that is movable on at least three axes of translation, termed the longitudinal axis X, the transverse axis Y and the vertical axis Z for machining an immobile workpiece fixed above the machining head on the Z axis. The machining head is kept in a constant orientation by connection means comprising at least three hinged links. Two links of the three links form with the machining head and with a first Y carriage to which they are hinged a first hinged parallelogram that is deformable in the plane defined by the X and Z directions. At least one other link of the three or more links is hinged both to the machining head and to a second Y carriage, so that the hinged assembly formed by the at least one link, the machining head and the second Y carriage is deformable in the plane defined by the X and Z directions. The first Y carriage is movable in a direction parallel to the Y axis on a first X carriage that is movable in a direction parallel to the X axis and the second Y carriage is movable in a direction parallel to the Y axis on a second X carriage that is movable in a direction parallel to the X axis.

In one particular embodiment, in order to increase the stiffness of the device, the device comprises at least four hinged links, of which at least two links form with the head and with the second Y carriage to which they are hinged a second hinged parallelogram that is deformable in the plane defined by the X and Z directions, similar to the first hinged parallelogram formed by at least two links, the machining head and the first Y carriage.

In order to produce the movements of the machining head with the desired amplitude in the X and Z directions, the position along the X axis of the machining head is modified by a simultaneous movement of both X carriages, and in which the position along the Z axis of the machining head is modified by a relative movement of the two X carriages with respect to each other.

To provide the stability of the machining head and the necessary stiffness of the parallelograms, each link comprises at least two clevises at each of its hinged ends, whose axes are essentially parallel to the Y direction. The shapes of the links are preferably trapezoidal, with the short base hinged to the machining head and the long base hinged to the Y carriage, and the links are hinged by means of taper roller bearings mounted in opposition.

In a preferred embodiment, each X carriage comprises a beam on which sliding tracks are mounted parallel to the Y axis and on which the Y carriages run. To achieve a suitable stiffness, the beams may for example have an essentially triangular or trapezoidal closed cross section, and the faces of the beams on which the Y carriages run are preferably essentially vertical, and preferably inclined by less than or equal to 45° relative to the vertical.

In one embodiment the Y carriages are driven along the Y axis by ball screws located in the tops of the beams in order to move the center of gravity of the device towards its center of inertia and to limit deformations.

For travel along the X axis, the X carriages comprise guide means which are advantageously mounted on end plates attached to the ends of the beams and simultaneously increase its torsional stiffness. The stiffness of the connection between the end plates and the beams is reinforced if necessary by at least one stiffening element.

To produce the combined movements of the X carriages and Y carriages which generate the complex path of the machining head along the X, Y and Z axes, the various movements of the carriages are controlled by numerical control means. Depending on the requirements of the workpieces, the machining head comprises at least one spindle of a machining tool whose axis can be oriented along directions other than the vertical Z.

The aspects of the disclosed embodiments also relate to a machine tool for a highly compact and productive machining center that comprises a machining device as described herein positioned in a tunnel, with the workpiece fixed to its ceiling, and wherein the X carriages travel along the X axis, being supported on guide means in the X direction fixed to the side walls of the tunnel.

BRIEF DESCRIPTION OF THE DRAWINGS

The detailed description of the aspects of the disclosed embodiments is given with reference to the figures, which show.

DETAILED DESCRIPTION OF THE DISCLOSED EMBODIMENTS

Figure 1:
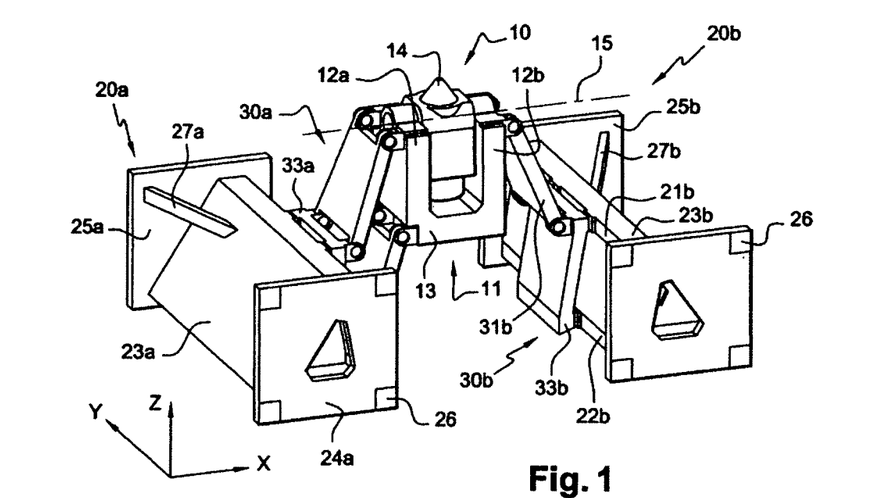
FIG. 1: a perspective view of the main elements of the assembled device.

As shown in FIG. 1 the device comprises a machining head 10, first and second carriages 20a, 20b which are movable along an approximately horizontal axis X and are referred to as the X carriages, and connecting means 30a, 30b which keep the machining head 10 in position relative to the X carriages 20a, 20b, respectively.

At least one connecting means 30a comprises at least two links 31a and 32a, each link being hinged at one end to the machining head 10 and at the other end to a first carriage 33a, said carriage, termed Y carriage, being fixed movably to the first X carriage 20a with the ability to travel along said X carriage in an approximately horizontal direction Y approximately perpendicular to the X axis of travel of said carriage.

The second connecting means 30b comprises at least one link 31b hinged at one end to the machining head 10 and at its other end to a second Y carriage 33b, said Y carriage being fixed movably to the second X carriage 20b with the ability to travel along said X carriage in the Y direction.

The links 31a, 32a, 31b are designed with appropriate stiffness for the static and dynamic loads of the machining which the machining center to which the device is fitted must exert. Each link is hinged in such a way that the machining head 10 can be moved vertically translationally along a Z axis in a reference frame connected to said head, that is to say in a direction approximately perpendicular to the plane defined by the X and Y directions of travel of the carriages, and is held in a fixed position on the other axes both translationally and rotationally. This result is achieved partly by hinging the links in such a way that the links 31a, 32a between the first Y carriage 33a and the machining head 10 formed a parallelogram which has the effect of keeping the machining head in a steady orientation and partly by having hinge pins connecting the links 31a, 32a, 31b to the machining head 10 and to the Y carriages 33a, 33b which are parallel and approximately parallel to the Y axis.

Figure 2:
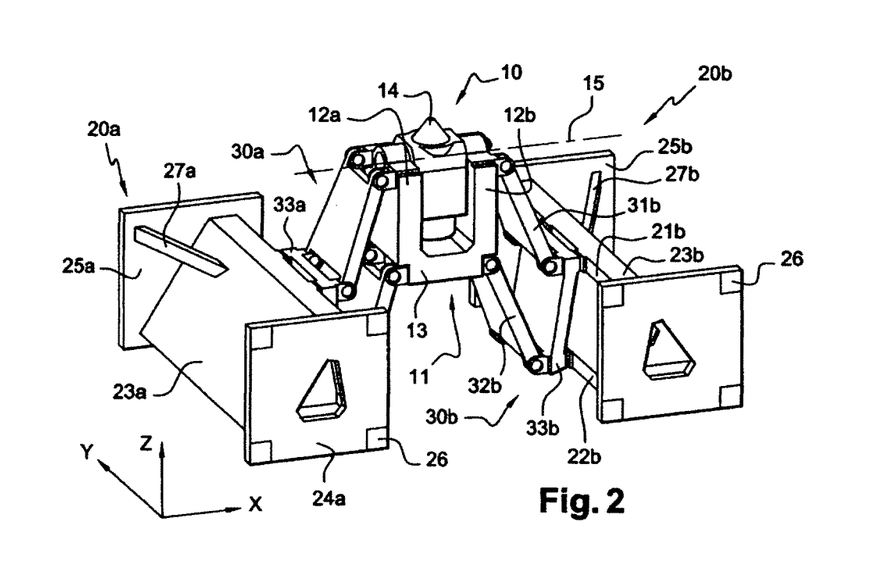
FIG. 2: a perspective view of a variant of the device.

In one particular embodiment illustrated in FIG. 2, the second connecting means 30b also has at least two links 31b, 32b hinged to the machining head 10 and to the Y carriage 33b in such a way that said two links, the X carriage 33b and the machining head 10 form a parallelogram similar to that formed by the links 31a, 32a of the first connecting means 30a.

To provide the necessary stiffness on the Y axis, each link is preferably a trapezoid whose short base is hinged to the machining head 10 by at least two clevises of axis parallel to the Y axis and whose long base is hinged to the associated Y carriage also by at least two clevises of axis parallel to the Y axis.

Each Y carriage 33a, 33b is fixed to the corresponding X carriage 20a, 20b by sliding tracks 21a, 22a and 21b, 22b, respectively. These are mounted on the corresponding X carriage and allow the Y carriage to be moved translationally in the Y direction along the X carriage without any other relative movement being permitted between the X carriage and the Y carriage.

Each X carriage 20a, 20b advantageously has a beam 23a, 23b, respectively, oriented along the Y axis and ending in two end plates 24a, 25a and 24b, 25b, respectively. The beam supports the sliding tracks 21a, 22a and 21b, 22b, respectively. The plates 24a, 25a, 24b, 25b at the ends of the beams 23a and 23b contribute to the torsional stiffness of the beams and support guide means 26, such as guiding pads, for engaging with the structure supporting the X carriages 20a and 20b.

The beams 23a and 23b have to support machining loads and be stiff enough to prevent vibrations incompatible with machining.

Such stiffnesses are relatively easy to achieve without increasing the mass because of the simple shape of the beams in the absence of a complex mobile structure such as a gantry. For example, as shown in the partial view, FIG. 3, the cross section of the beam 23a, 23b is advantageously closed and roughly triangular or trapezoidal, giving it great bending stiffness, and the end plates attached to the beam provide additional torsional stiffness to the shape of the section.

Each X carriage 20a, 20b is movable in the X direction of travel. Means (not shown) provide controlled movement of the X carriages: for example, translational drive devices using ball screws or racks. Travel in the X direction of the X carriages is a joint movement of both X carriages in which the distance separating the two carriages is constant, or a differential travel in which the distance between the two X carriages varies, or a combination of these two movements.

These movements, whether joint or relative, of the two X carriages can be brought about either by an independent movement of each X carriage, with the position of each carriage being checked against a common reference point, or by an absolute movement of one of the X carriages and a relative movement of the other X carriage with respect to the first.

Each Y carriage 33*a*, 33*b* is movable in the Y direction along the beam 23*a*, 23*b*, respectively, on which it is mounted. Controlled movement of the Y carriages can be achieved by any conventional means, such as screw or rack. In one particular embodiment, only one of the Y carriages 33*a* or 33*b* is driven along Y by said means, while the Y carriage that is not driven by these means is driven freely simply because of the torsional stiffness of the connections of the links 31*a*, 32*a*, 31*b* and 32*b*. In another embodiment both Y carriages 33*a* and 33*b* are driven by synchronized means to improve the accuracy of the position along Y of the machining head 10 and limit the asymmetry of the loading within the device.

The machining head 10 has a rigid structure 11 which:
comprises the points of attachment of the hinged links, variously 31*a*, 32*a* and 31*b*, 32*b*, to form the sides 12*a*, 12*b*, respectively, of the parallelogram of the connecting means,
and provides a rigid connection 13 between the two sides 12*a* and 12*b* and therefore between the points of attachment of the links 31*a*, 32*a*, 31*b*, 32*b*.

This rigid structure 11, which maintains a constant orientation because of the geometry of the parallelogram or parallelograms formed by the links on which it is supported, supports a spindle 14 for spinning a machining tool (not shown) about its axis. This machining spindle 14 is a conventional spindle such as an electrically powered or hydraulic spindle mounted in a fixed manner on the rigid structure 11 or in a hinged manner about one or more axes if the axis of the tool is required to be adjustable to suit machining requirements. FIG. 1 illustrates the case of a spindle 14 capable of being pivoted relative to the rigid structure 11 about an axis 15 parallel to the X axis of travel.

The device thus enables the machining head 10 to be moved translationally along the three main axes.

Travel along the X axis by the X carriages 20*a* and 20*b* allows the machining head 10 to travel along the X axis when the X carriages are moving simultaneously with a constant distance between the X carriages.

Travel along the Z axis, which is perpendicular to the plane defined by the X and Y axes of travel, by the machining head 10 is accomplished by varying the distance between the two X carriages 20*a* and 20*b*.

Combined travel of the X carriages 20*a* and 20*b* by conventional numerical control of machining tools thus makes it easy to produce all the paths in the plane defined by the X and Z axes for the tool mounted on the machining head, within the limits allowed by the dimensions and geometry of the means employed.

Simultaneous movement of the Y carriages 33*a* and 33*b* enables the machining head to be moved in the Y direction within the limits imposed by the length of the beams 23*a* and 23*b*.

All of these translational movements are accomplished by means which can be designed with high stiffness without making the masses of the moving parts large as in the case of gantries.

Figure 4:
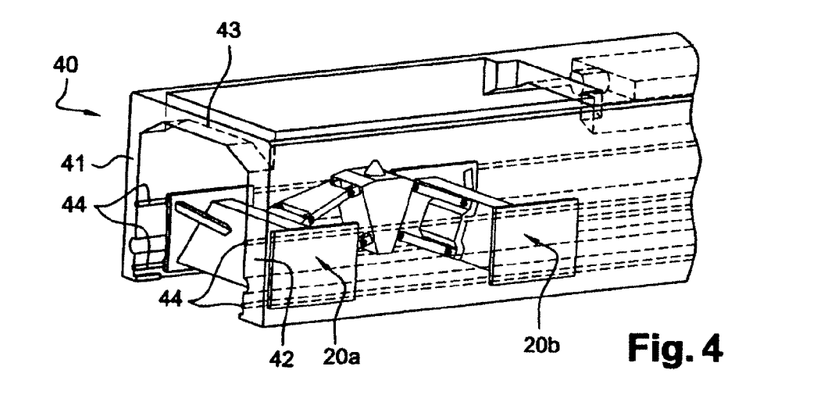
FIG. 4: a partial schematic view of a machining center using the device in a machining tunnel.

The reason for this is that, as illustrated in FIG. 4, the X carriages 20*a* and 20*b* are supported during their movements on fixed guide means 44. Said fixed guide means are supported by structures 41, 42 that are fixed with respect to the floor and said structures can be reinforced as much as need be without fear of increasing the mass of the moving assembly, which would have a negative effect on the dynamic performance of the device.

A device according to the aspects of the disclosed embodiments makes it possible to achieve, when the device is not actually carrying out a machining, speeds of travel of ten to twenty times greater than with a gantry offering equivalent machining capabilities, yet with much greater stiffness while machining. This speed of travel in non-machining time is essential because many operations, such as changing a tool or inspecting the workpiece during machining, require moving the machining head away, and the amount of time lost to the actual machining process can be as much as 50% of the time for which the machine is in use on conventional machines.

Initial tests show that, for equivalent machining capabilities, the device according to the aspects of the disclosed embodiments has no difficulty achieving higher stiffnesses in dynamic operation than the stiffnesses currently achieved with a gantry in static operation.

The movements of the machining head and the axis of the machining tool are arranged so as to machine a workpiece positioned above the X carriages 20*a* and 20*b* and above the machining head 10. Said workpiece may for example be fixed to the ceiling 43 of a machining tunnel 40 whose length is in theory unlimited and which is advantageously adapted to suit the greatest length of the workpieces, taking into account the volumes necessary for housing the various parts of the device which extend beyond the zone reachable by the machining head.

The machining tunnel 40 is advantageously large enough to accommodate the largest workpiece 104, the machining device and its movements, both during machining operations and maintenance operations.

Furthermore, for easier maintenance of the machining tunnel, it is preferable to move the machining device out of its work zone, for example to one of the ends 123 of the tunnel.

Since, unlike a gantry, the tunnel 40 is fixed, it does not limit the accelerations of the movements of the machining head. The materials used can therefore be very dense, antivibratory, with the necessary thicknesses for the desired stiffness.

When a machining tunnel 40 is used, the guiding pads 26 of the X carriages 20*a* and 20*b* advantageously bear on the fixed guide means 44 attached to approximately vertical side walls 41, 42 of the tunnel 40.

An important advantage of overhead machining is that, even though special workholding means may be required, the chips of machined material are carried away naturally by gravity. There is therefore no need to use large amounts of cutting oil in an attempt to carry away the chips, and dry machining is possible without fear of damage to the workpiece from the very hot chips.

Figure 5A:
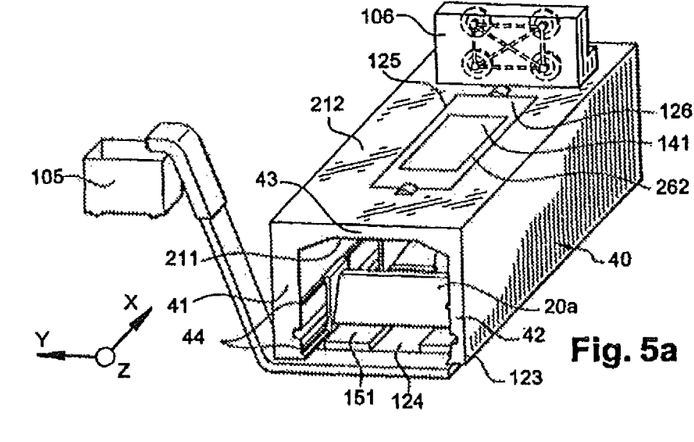
FIG. 5a: a partial schematic view of a machining center using the device in a machining tunnel and the chip conveying means.

Advantageously, as illustrated in FIG. 5*a*, the machining tunnel 40 is provided with a chip collection device 105, preferably located at one end 123 of the tunnel 40. In an example of an embodiment, the chips are collected by a chip conveying means 151, which may be a belt or the like, positioned beneath the machining head, to carry away said chips to said collection device.

To facilitate tool loading by the operator, the tunnel 40 is advantageously provided with a magazine of cutting tools 106.

To allow automatic tool control and tool changing without operator intervention, the magazine 106 is advantageously fitted with an automatic tool changing device.

The magazine 106 and the tool changing device are preferably situated at one end of the tunnel, the magazine 106 being fixed to an upper part of the ceiling 43 of the tunnel 40, termed the roof 212, and the tool changing device situated underneath the magazine 106, inside the tunnel 40. Said magazine is large enough to comprise as many tools as are required to produce one part 104, without requiring operator intervention during the machining process.

Advantageously, because of its closed configuration, the machining tunnel 40 allows high-pressure lubrication, at pressures of for example greater than 15 bar, impossible to use on open machines in a workshop. The lubricant is evacuated naturally by gravity from the workpiece 104 during machining and simultaneously helps to drain the chips to the floor. What is more, said configuration virtually eliminates pollution of the atmosphere of the workshop with the cutting oils.

Figure 5B:
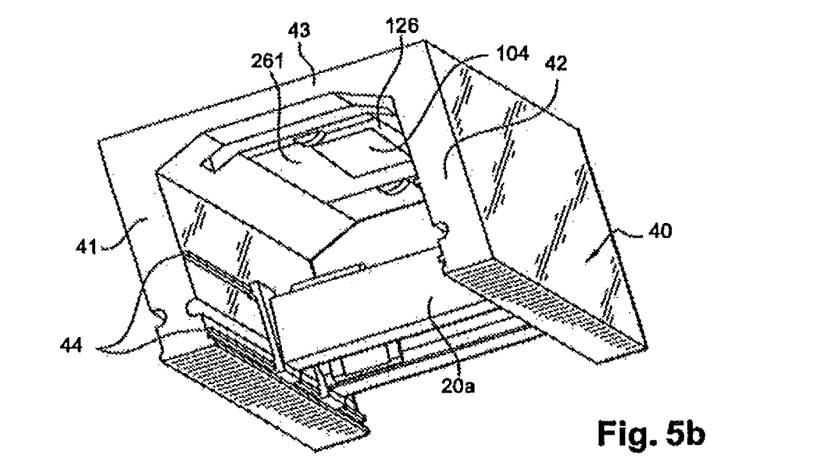
FIG. 5b: a bottom view of the machining center using the device in a machining tunnel.

In one example of an embodiment, as illustrated in FIG. 5b, in order to install and fix the workpiece 104 to the ceiling 43 of the tunnel 40, said workpiece is positioned on the ceiling 43 by a second carriage (not shown), and the machining device with the machining head is kept at one end 123 of the tunnel. An operator then clamps said workpiece to the ceiling 43.

In another example of an embodiment, the ceiling 43 of the tunnel 40 contains an opening 125 to accommodate a table 126 on which the workpiece 104 is held by conventional means. Said table is raised from the roof 212 by a lifting means such as a traveling bridge (not shown), before being placed on a support which is then used to invert said table in order to prepare the workpiece. Said lifting means allows said table to be rested in the opening 125 again. Advantageously, means such as clamps are provided to secure said table 126 to the tunnel ceiling 43 to prevent any movement of the table 126 and therefore of the workpiece 104 during machining.

In another example of an embodiment, operations of preparing workpieces while a previous workpiece is being machined can be performed, using a reversible table 126. This reversible table does not increase the area occupied on the floor by the machine for workpiece preparation. It is therefore possible simultaneously to machine one workpiece 104 on one face 261 of the table 126 while at the same time preparing another workpiece 41 on a second face 262, opposite the first face 261. Means are then provided to enable the table to be turned upside down.

In one particular form of this example of an embodiment, said reversible table pivots about its longitudinal axis.

Said table is necessarily designed to cope with all the machining loads. It is preferably stiff enough that the setting up of workpieces 141 while other workpieces are being machined does not interfere with the machining operation ongoing inside the tunnel, such as vibrations from clamping the workpieces 141.

In a first embodiment of the tunnel 40, in order to facilitate the loading of workpieces 141 onto the table 126 and their unloading, the roof 212 of the tunnel 40 is roughly flush with the workshop floor or slightly raised above it. The chip collection device 105 is preferably at floor level. This embodiment allows for a ventilated workshop, with a noticeable reduction in atmospheric pollution and noise within the workshop.

In a second embodiment of the tunnel 40, said tunnel 40 is assembled on the floor of the workshop and a false floor, situated approximately flush with the roof 212 of the tunnel, simplifies the operations of preparing the workpiece 141 while a previous workpiece is being machined, on the face 262 of the table situated outside the tunnel 40. The chip collection device 105 is preferably located at one end 123 of the tunnel 40. In this case it is advantageously possible to provide an opening at one end of the tunnel for easy access to the tunnel 40 for maintenance.

For machining several workpieces simultaneously, it is possible to widen the tunnel 40 and fit two machining heads to the same machining device. However, as in the case of conventional gantry machines, there are still many constraints, such as coupling the machining heads (setting the tools at roughly the same height, selecting the same class of tool) or stopping all of the machining heads in order to maintain one of them. In view of the relative simplicity and reduced mass of the machining device, it is preferable to use two independent machining devices, each with one machining head, rather than one machining device having two machining heads. Moreover, such an arrangement with two independent machining devices is found not to occupy significantly more space on the floor than one machining device with two machining heads.

In the practical design of such a machine it is particularly important to consider the problems of stiffness, which have an impact on machining quality. The various parts (beams and links in particular) which influence the stiffness and vibrational behavior of the device, have stiffnesses which, in number and position, are adapted to the machining conditions, machining loads and frequencies of the vibrations that are likely to occur.

Figure 3:
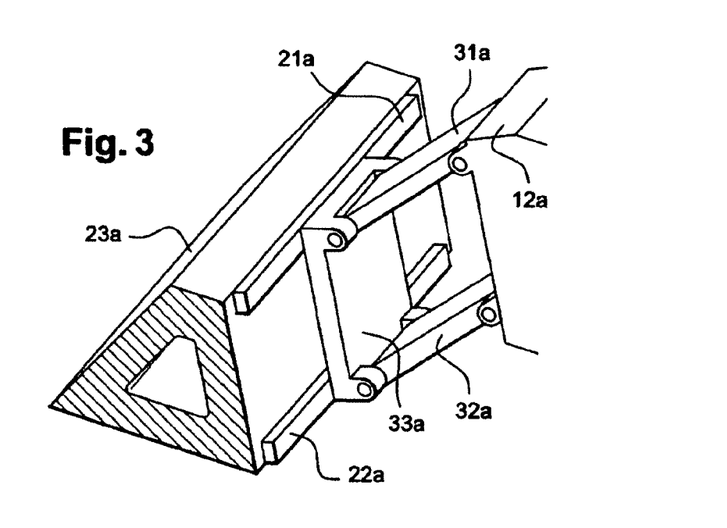
FIG. 3: a partial view of the device.

The hinged connections of the links 31a, 32a, 31b, 32b advantageously comprise clevises, preferably in pairs, generously designed and incorporating pairs of taper roller bearings mounted in opposition to ensure good stiffness of the connections, as shown in FIG. 3.

The stiffness of the connection between the beam 23a, 23b and the side plate 25a, 25b, respectively, can if required be reinforced with a stiffening element 27a, 27b, respectively.

Those faces of the beams 23a and 23b which provide support to the Y carriages 33a, 33b, respectively, are advantageously close to the vertical, preferably inclined at an angle of less than 45° with respect to the plane defined by the Y and Z directions. This enables the assembly to be made more rigid and allows better transmission of the loads involved in moving the machining head (10) in the Z direction.

Figure 8:
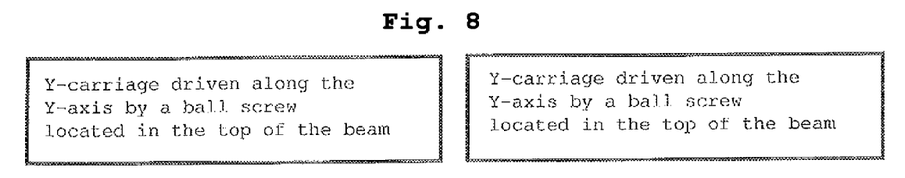
FIG. 8: a schematic illustration of the means of translational drive of the Y carriages 33a and 33b.
Figure 9:
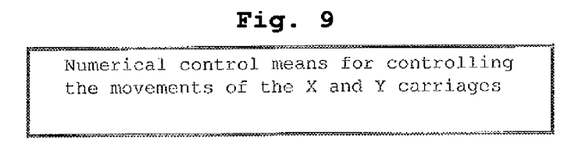
FIG. 9: a schematic illustration of the numerical control means.

The means of translational drive of the Y carriages 33a and 33b, which may for example be ball screws, are advantageously positioned above the Y carriages, in the top of the beam 23a, 23b. Such an arrangement allows the center of gravity of the device to be raised and allows said center of gravity to be positioned closer to the center of inertia. The overall stiffness is thereby improved and deformations of the machining tool are reduced.

Figure 6A:
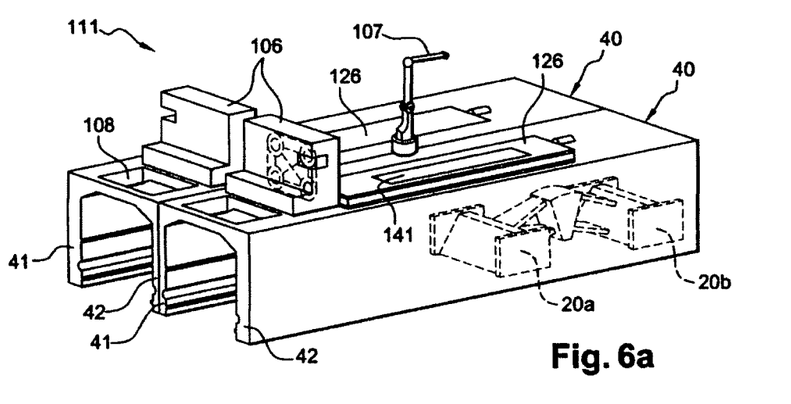
FIG. 6a: a perspective view of a machining center using two devices.
Figure 6B:
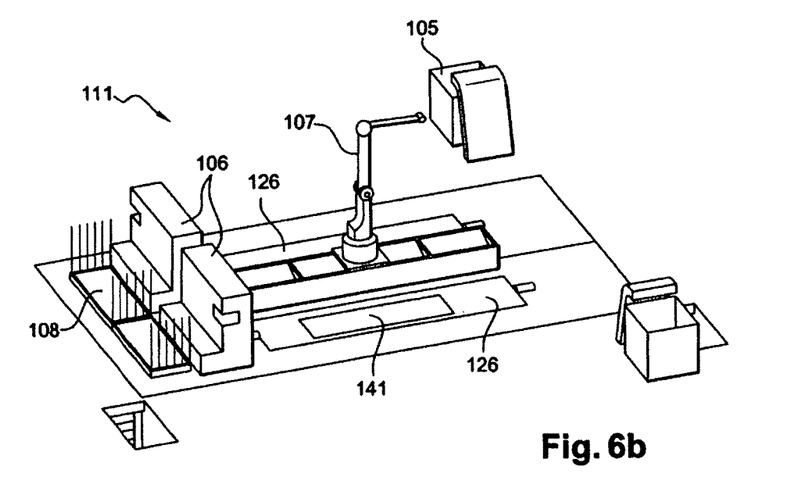
FIG. 6b: a layout view of a machining center using two devices and their common handling means.

In one embodiment, a machining center 111 with two machining heads 10 comprises:
  two machining tables 126,
  a handling means 107, and
  a workpiece storage area 108.

The handling means 107 is positioned in such a way as to allow said handling means to perform all the movements of the workpieces 141 destined for the two machining tables 126.

The storage area 108 is preferably located at one of the ends of the tables so that it can be shared between said two tables.

In an example of an embodiment, as illustrated in FIGS. 6a, 6b, two tunnels 40, each comprising a table 126 and a machining device with one machining head 10, are arranged with their axes parallel and their ends lying in the same vertical planes and they are joined at one of their side walls 41, 42. This so-called two-tunnel configuration allows simultaneous and independent machining of two workpieces with minimum occupation of the workshop floor space.

Figures 11, 12:
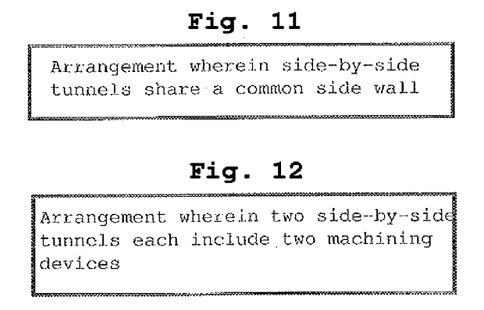
FIG. 11: a schematic illustration of an arrangement wherein side-by-side tunnels share a common side wall.
FIG. 12: a schematic illustration of an arrangement wherein two side-by-side tunnels each include two machining devices.

In one particular embodiment, the two joined walls 41, 42 form only a single wall. This two-tunnel configuration with a single wall between the two tunnels, advantageously comprising a stiffener, allows the thickness of the material used to be reduced while maintaining the necessary stiffness.

In another example of an embodiment, a single tunnel 40, whose length has been doubled, comprises the two tables 126 extending colinearly from each other, and the two machining devices having one machining head. The two machining devices can travel the full length of the tunnel 40 and can thus be used for machining on either table 126 with equal ease. Thus, with this configuration of a single tunnel, a maintenance zone (not shown), preferably in the center of the tunnel, can be shared by both machining devices for their maintenance. Chips from each machining tunnel 40 are advantageously conveyed to a shared chip collection device 105.

Figure 7:
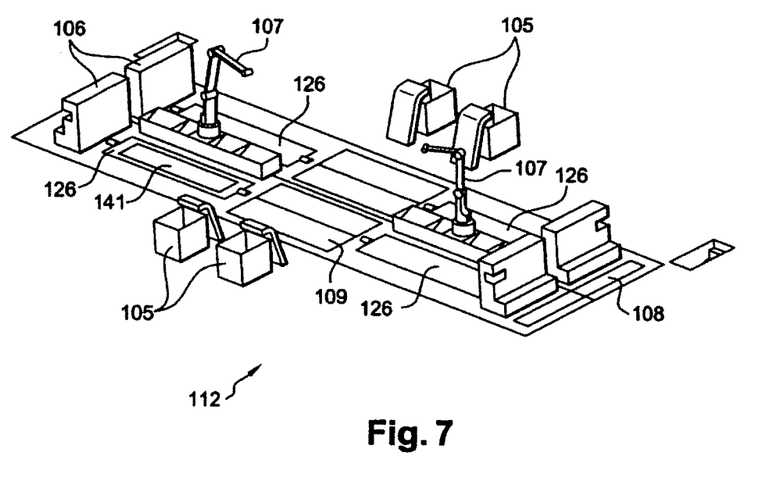
FIG. 7: a layout view of a machining center using four devices and a shared maintenance area.

In another embodiment, as shown in FIG. 7, a machining center 112 with four machining heads comprises:
- four tables 126,
- a maintenance zone 109,
- two handling means 107, and
- two workpiece storage areas 108.

In this embodiment the four tables are laid out in parallel pairs.

The maintenance zone 109 is laid out in such a way that it uses shared command and control means and is situated between the aligned tables. If the ceilings of the machining tunnels are approximately flush with the workshop floor, said maintenance zone is also used for lifting and carrying out necessary maintenance on the four machining devices.

Each handling means 107 is positioned so as to allow each handling means to carry out all the movements of the workpieces 141 destined for the two machining tables 126.

Each storage area 108 is laid out to be shared between said two tables and is preferably located at the end of two tables 126 opposite the maintenance zone 109.

Such a layout for a machining center 112 with four machining heads can be used to machine four workpieces 104 simultaneously, without the constraints associated with coupling, yet within a floor space substantially the same as or even less than that of conventional four-head gantry-type machine tools.

In an example of an embodiment, two two-tunnel configurations, as described above, are connected in parallel. Each two-tunnel configuration has a joint double wall or a shared dividing wall.

In another example of an embodiment, two parallel and independent tunnels 40 of double the length and each having two tables 126 extending colinearly from each other and two machining devices with one machining head are placed side by side through one of their side walls 41, 42, or alternatively share a common dividing wall. The two machining devices can travel the full length of the tunnel 40 and can thus be used for machining on either table 126 with equal ease.

Figure 10:
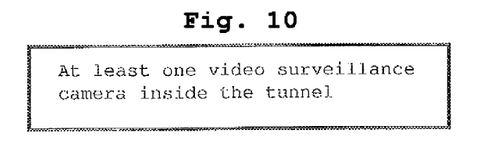
FIG. 10: a schematic illustration of a camera for the tunnel.

To monitor for potential accidents and ensure safety inside the tunnel, at least one video surveillance camera and at least one emergency stop control are preferably installed inside the tunnel 40, with a surveillance display connected to the camera and set up for example in the vicinity of the control panel of the machining center or machining head in question.

The disclosed embodiments thus make it possible to build a faster, more productive numerical-control machining tool than conventional gantry-type machines for machining workpieces mounted on fixed tables.

The invention claimed is:

1. A machining device comprising at least one machining head that is movable along at least three axes of translation, termed the longitudinal axis X, the transverse axis Y, which is transverse with respect to the X axis, and the vertical axis Z, which is transverse with respect to the X and Y axes, for machining an immobile workpiece, wherein:
   - the workpiece is fixed above the at least one machining head on the Z axis;
   - the at least one machining head is kept in a constant orientation by connection means comprising at least three hinged links;
   - two links of the at least three links are hinged to the at least one machining head and to a first Y carriage so as to form a first parallelogram that is deformable in the plane defined by the X and Z directions;
   - at least one other link of the at least three links is hinged both to the at least one machining head and also to a second Y carriage, so that the hinged assembly formed by the at least one other link, the at least one machining head and the second Y carriage is deformable in the plane defined by the X and Z directions;
   - the first Y carriage is movable in a direction parallel to the Y axis on a first X carriage that is movable in a direction parallel to the X axis; and
   - the second Y carriage is movable in a direction parallel to the Y axis on a second X carriage that is movable in a direction parallel to the X axis.

2. The device as claimed in claim 1 wherein the at least three hinged links comprises at least four hinged links and wherein said at least one other link and also at least a further link of the at least four links are hinged to the at least one head and to the second Y carriage so as to form a second hinged parallelogram that is deformable in the plane defined by the X and Z directions.

3. The device as claimed in claim 1 in which the position of the at least one machining head along the X axis is modified by a simultaneous movement of both of the X carriages, and in which the position of the at least one machining head along the Z axis is modified by a relative movement of the two X carriages with respect to each other.

4. The device as claimed in claim 1, in which each of the links comprises a clevis at each of the hinged ends of the respective link, wherein the pivot axes of each of the devises are essentially parallel to the Y direction.

5. The device as claimed in claim 4, in which the links are hinged by means of taper roller bearings mounted in opposition.

6. The device as claimed in claim 1, in which the shapes of the links are trapezoidal, the short base of each of the links being hinged to the at least one machining head and the long base of each of the links being hinged to the respective first or second Y carriage.

7. The device as claimed in claim 1, in which each of the X carriages comprises a beam on which sliding tracks are mounted parallel to the Y axis and on which the Y carriages run.

8. The device as claimed in claim 7, in which the beams have an essentially triangular or trapezoidal closed cross section.

9. The device as claimed in claim 7, in which faces of the beams on which the Y carriages run are inclined by less than or equal to 45° relative to the vertical.

10. The device as claimed in claim 9, in which the faces of the beams on which the Y carriages run are the essentially vertical.

11. The device as claimed in claim 7, in which the Y carriages are driven along the Y axis by ball screws located in the tops of the beams.

12. The device as claimed in claim 1, in which the X carriages each comprise guide means for guiding the travel of the respective X carriage along the X axis.

13. The device as claimed in claim 12, in which each X carriage comprises a beam, and wherein the guide means are arranged on end plates fixed to ends of the beams.

14. The device as claimed in claim 13, in which at least one stiffening element reinforces the connection between one of the end plates and the respective beam.

15. The device as claimed in claim 1, in which the movements of the X carriages and Y carriages are controlled by numerical control means, in order to provide translation of the at least one machining head along the X, Y and Z axes.

16. The device as claimed in claim 1, in which the at least one machining head comprises at least one spindle for a machining tool, wherein the machining tool rotational axis can be oriented along directions other than the vertical Z axis.

17. A machine tool for machining fixed workpieces during machining operations, comprising a device as claimed in claim 1, in which machine tool the device is positioned in a tunnel, with the workpiece fixed to a ceiling of the tunnel, and wherein the X carriages travel along the X axis, and wherein the X carriages are supported on guide means that extend in the X direction and that are fixed to side walls of the tunnel.

18. The machine tool as claimed in claim 17, in which the length of the tunnel is greater than the length of the largest workpiece to be machined.

19. The machine tool as claimed in claim 17, comprising means for conveying chips generated during the machining of the workpieces to one of the ends of the tunnel and towards a chip collection device.

20. The machine tool as claimed in claim 17, in which the ceiling of the tunnel comprises an opening capable of accommodating a table on which the workpiece is held.

21. The machine tool as claimed in claim 20, in which the table is reversible.

22. The machine tool as claimed in claim 21, in which the reversible table pivots about a horizontal axis.

23. The machine tool as claimed in claim 17, in which the ceiling of the tunnel is essentially flush with the floor of a workshop.

24. The machine tool as claimed in claim 17, in which the tunnel is flush with the floor of a workshop.

25. The machine tool as claimed in claim 17, in which a false floor for a workshop is constructed, which false floor is essentially flush with a roof of the tunnel to define a work zone.

26. The machine tool as claimed in claim 17, further comprising a surveillance camera inside the tunnel.

27. A machining center for machining fixed workpieces during machining operations, wherein the machining center comprises two of the machine tools as claimed in claim 17 and comprises a handling means and a storage area, both configured to be shared by the two machine tools.

28. The machining center as claimed in claim 27, in which the two tunnels of the two machine tools, each comprising a respective one of the machining devices, are side-by-side and parallel to one another, and wherein the adjacent side walls of the side-by-side tunnels are joined.

29. The machining center as claimed in claim 27, in which the two tunnels extend colinearly from each other.

30. A machining center for machining fixed workpieces during machining operations, characterized in that the machining center comprises four of the machine tools as claimed in claim 17 and comprises a maintenance zone configured to be shared by the four machine tools, two handling means, each configured to be shared by two of the machine tools, and two storage areas, each configured to be shared by two of the four machine tools.

31. The machining center as claimed in claim 30, in which the four of the tunnels, each comprising a respective one of the machining devices, are arranged in parallel pairs, with the two tunnels of each pair being parallel to one another and side-by-side to form a double tunnel, wherein the adjacent side walls of each of the double tunnels are joined.

32. A machining center for machining fixed workpieces during machining operations, the machining center comprising two machine tools, each machine tool comprising a machining device as claimed in claim 1, wherein the machining tools each comprise a tunnel in which a respective one of the machining devices is positioned, wherein a respective one of the workpieces is fixed to a respective ceiling of each the tunnels, wherein the X carriages travel along the X axis, wherein the X carriages are supported on guide means that extend in the X direction and that are fixed to side walls of the respective tunnel, wherein the two tunnels are arranged side-by-side and parallel to one another in a manner such that the two tunnels share a wall.

33. A machining center for machining fixed workpieces during machining operations, the machining center comprising four machine tools, each machine tool comprising a machining device as claimed in claim 1, wherein the machining tools each comprise a tunnel in which a respective one of the machining devices is positioned, wherein a respective one of the workpieces is fixed to a respective ceiling of each the tunnels, wherein the X carriages each travel along the X axis, wherein the X carriages are supported on guide means that extend in the X direction and that are fixed to side walls of the respective tunnel, wherein the four tunnels are arranged in parallel pairs, with the two tunnels of each pair being parallel to one another and side-by-side in a manner so as to form a double tunnel such that the two tunnels of each of the double tunnels share a side wall.

34. A machining center for machining fixed workpieces during machining operations, the machining center comprising four of the machining devices as claimed in claim 1, and further comprising two tunnels, each tunnel comprising two of the machining devices, wherein the tunnels are arranged side-by-side, such that a side wall of one of the tunnels is adjacent to a side wall of the other one of the tunnels, and wherein the adjacent side walls and are joined.

35. A machining center for machining fixed workpieces during machining operations, the machining center comprising four of the machining devices as claimed in claim 1, and further comprising two tunnels, each tunnel comprising two of the machining devices, wherein the tunnels are arranged side-by-side such that the two tunnels share a side wall.

* * * * *